Patented Feb. 21, 1939

2,148,175

UNITED STATES PATENT OFFICE 2,148,175

ABSORBENT MATERIAL FOR GAS MASKS

Richard W. Schmidt, Redondo Beach, Calif., assignor to The Evanston Company, Los Angeles, Calif., a corporation of Nevada No Drawing. Application May 16, 1938, Serial No. 208,333

3 Claims. (Cl. 252—2.5)

The object of the invention is to provide an inert, porous, fragmental material for filling gas masks and for absorbing and retaining protective agents placed therein.

In preparing my new filling material I select a grade of massive diatomaceous earth (lump earth as mined or quarried from the original deposit) which is as free as possible from water-soluble materials and which has a relatively low content of clay or clay-like material. This earth I break down into lumps of convenient size.

I then calcine these lumps by direct contact with fire gases containing an excess of oxygen until the organic matter usually present in the raw earth is burned away and the earth and clay are completely dehydrated. A rotating direct fired retort or a down draft kiln may be used for this purpose. A final temperature ranging from 1600° to 1800° Fahr. is usually suitable, though this temperature will vary with the sintering point of the clay present in the earth. The temperature should be sufficient to sinter the clay and thus give the maximum toughness to the product.

The calcined lumps, after cooling, are passed through a jaw or roll crusher by which they are reduced to small, more or less cubical fragments, which are then screened to the size range desired for the finished product, all finer and coarser fragments being rejected. The screened product should be roughly cubical or at least rectangular. If the fragments formed by crushing appear to be weakened by incipient shattering it may be desirable to pass the screened product through a tumbler rotated at a relatively low speed in order to disengage any loosened material and remove the sharp corners of the cubes. The tumbled product should then again be passed over the finer screen to remove any fines produced during the tumbling step. A suitable size range for the finished product is such as will pass a screen of ½ inch mesh and be retained on one of ¼ inch mesh, but of course other size ranges may be used if preferred.

It is possible and often desirable to vary the above described procedure by reducing the crude massive earth to the desired size range of the finished product or to a size range somewhat above that finally desired and to calcine the aggregate of small lumps thus produced, finally screening the calcined product to the exact size range required.

This procedure, particularly if the calcined step is performed in a rotating retort, avoids any necessity for tumbling after calcination. It has the further advantage that the undersize fragments and dust produced by crushing are retained in the form of crude earth, useful in the manufacture of diatomaceous earth powders, instead of being obtained as calcined fines of little or no utility.

A product made as above described from a properly selected California crude earth has the following properties:

Water absorption, not less than 100% of dry weight.
Loss on ignition, from 1.0% to 0.1% of dry weight.
Alkalinity as $Na_2CO_3$, from 0.02% to 0.05% by weight.
Loss of weight to shaking test, from 2% to 10%.
Compressive strength, 700 to 1000# per square inch.

The product made as above described is markedly superior to that produced by calcining an artificial mixture of finely comminuted diatomaceous earth and a sintering clay, for the reason that the comminuting step and the consequent degradation of the diatom structures have been avoided. The full absorptive power of the earth is thus retained.

Further, the strength of the product under compression far exceeds that of the artificial mixture, as is shown by the following records of actual crushing tests made under identical conditions; the readings being in pounds per square inch:

| | Pounds |
|---|---|
| Artificial material, #1, 3 tests | 200 |
| Artificial material, #2, 4 tests | 200 to 250 |
| Massive product, light burned, pressure applied along stratification planes, 3 tests | 700 to 950 |
| Same product, pressure perpendicular to stratification planes, 3 tests | 700 |
| Massive product, hard burned, pressure applied along stratification planes, 3 tests | 800 to 950 |
| Same product, pressure perpendicular to stratification planes, 3 tests | 750 to 800 |

I claim as my invention:

1. In combination with a gas mask: a filling material consisting substantially of lumps of calcined diatomaceous earth, said lumps being individual fragments of the original massive earth and of such dimensions as to permit unimpeded passage of gases therebetween, the material of said lumps having a water absorption value approximating 100 percent of the dry weight and a compressive strength not substantially less than 700 pounds per square inch.

2. The method of manufacturing a filling material for gas masks which comprises: calcining lumps of diatomaceous earth by externally applied heat, said lumps being individual fragments of the original massive earth; conducting said calcination at a temperature not substantially less than 1600° Fahr. and for a time sufficient to impart to the material of said lumps a compressive strength not substantially less than 700 pounds per square inch, and so controlling the time and temperature of said calcination as to impart to said lumps a water absorptive value not substantially less than 100 percent of the dry weight.

3. The method of manufacturing a filling material for gas masks which comprises: breaking massive diatomaceous earth into relatively large lumps; calcining said lumps by externally applied heat at a temperature not substantially less than 1600° Fahr. until the compressive strength of said lumps is brought to not substantially less than 700 pounds per square inch; terminating the calcination before the absorptive value of said lumps is brought below approximately 100 percent of the dry weight; crushing the calcined lumps to produce relatively small lumps; separating the crushed product into fractions of which one is retained on a 4-mesh screen and the other passes through said screen, and collecting the fraction retained on said screen as the product of the operation.

RICHARD W. SCHMIDT.